(12) United States Patent
Weng et al.

(10) Patent No.: US 10,324,556 B2
(45) Date of Patent: Jun. 18, 2019

(54) TOUCH DISPLAY APPARATUS

(71) Applicant: HON HAI PRECISION INDUSTRY CO., LTD., New Taipei (TW)

(72) Inventors: Yu-Fu Weng, New Taipei (TW); Chia-Lin Liu, New Taipei (TW); Chien-Wen Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 7 days.

(21) Appl. No.: 15/631,049

(22) Filed: Jun. 23, 2017

(65) Prior Publication Data

US 2018/0046303 A1 Feb. 15, 2018

Related U.S. Application Data

(60) Provisional application No. 62/374,118, filed on Aug. 12, 2016.

(51) Int. Cl.
*G06F 3/041* (2006.01)
*G06F 3/044* (2006.01)

(52) U.S. Cl.
CPC ............ *G06F 3/0414* (2013.01); *G06F 3/044* (2013.01); *G06F 3/0412* (2013.01); *G06F 2203/04112* (2013.01)

(58) Field of Classification Search
None
See application file for complete search history.

(56) References Cited

U.S. PATENT DOCUMENTS

| 2011/0080373 | A1 | 4/2011 | Wang et al. |
| 2013/0082970 | A1* | 4/2013 | Frey ...................... G06F 3/0414 345/173 |
| 2017/0371447 | A1* | 12/2017 | Fukushima ......... G02F 1/13338 |

FOREIGN PATENT DOCUMENTS

TW 201706805 A 2/2017

* cited by examiner

*Primary Examiner* — Joseph R Haley
*Assistant Examiner* — Emily J Frank
(74) *Attorney, Agent, or Firm* — ScienBiziP, P.C.

(57) ABSTRACT

A touch display apparatus a display unit and a touch unit. The display unit displays images and the touch unit which is overlapped on the display unit can sense independently a touch action applied on the touch unit and also the pressure applied in such touch. The touch display apparatus virtually simultaneously operates under a display period and a touch period in one frame for improving accuracy of determining the aspects of a touch function.

20 Claims, 9 Drawing Sheets

54

541

TOUCH DISPLAY APPARATUS

CROSS-REFERENCE TO RELATED APPLICATIONS

This application claims priority to U.S. Provisional Application No. 62/374,118 filed on Aug. 12, 2016, the contents of which are incorporated by reference herein.

FIELD

The subject matter herein generally relates to a touch display apparatus.

BACKGROUND

A touch screen panel can be manufactured by incorporating a touch panel in a display panel. Such a touch screen panel is used as an output device for displaying images while also being used as an input device. However, the touch screen panel cannot always accurately sense the pressure of a touch action applied on the touch screen panel.

BRIEF DESCRIPTION OF THE FIGURES

Implementations of the present technology will now be described, by way of example only, with reference to the attached figures.

DETAILED DESCRIPTION

Figure 1:
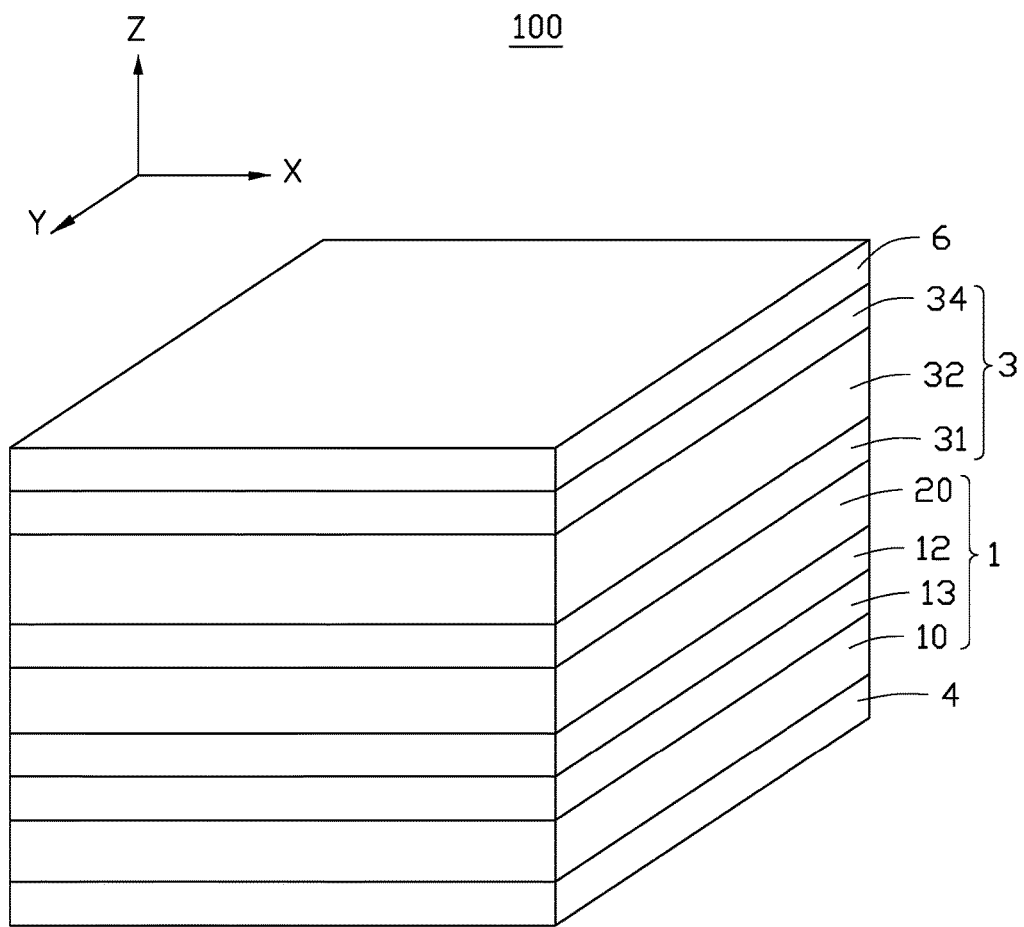
FIG. 1 is a perspective view of an exemplary embodiment of a touch display apparatus.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series, and the like.

The present disclosure provides a touch display apparatus 100 with a function of sensing the pressure of a touch action applied on the touch display apparatus 100.

FIG. 1 illustrates an exemplary embodiment of the touch display apparatus 100. The touch display apparatus 100 is capable of sensing not only touch position when a user's finger is pressed on the touch display apparatus 100 but also the pressure of the user's finger. In this exemplary embodiment, the touch display apparatus 100 is a liquid crystal display or an organic light emitting display.

The touch display apparatus 100 includes a display unit 1, a touch unit 3, a first polarizer layer 4, and a second polarizer layer 6. The display unit 1 and the touch unit 3 overlap each other. The first polarizer layer 4 is formed on a surface of the display unit 1 opposite from the touch unit 3. The second polarizer layer 16 is formed on a surface of the touch unit 3 opposite from the display unit 1. Thus, the touch unit 3 and the display unit 1 are sandwiched between first and second polarizer layers 4 and 6, respectively.

The display unit 1 includes a first substrate 10, a second substrate 20, a color filter layer 12, and a liquid crystal layer 13. The first substrate 10 is made of, for example, transparent glass, quartz, or plastic. Also, in other exemplary embodiments, the first substrate 10, may be formed of, for example, ceramic or silicon materials. Further, in other exemplary embodiment, the first substrate 10 may be, for example, a flexible substrate. Suitable materials for the flexible substrate comprise, for example, polyethersulfone (PES), polyethylenenaphthalate (PEN), polyethylene (PE), polyimide (PI), polyvinyl chloride (PVC), polyethylene terephthalate (PET), or combinations thereof. In at least one exemplary embodiment, the first substrate 10 is a thin film transistor (TFT) array substrate, and a TFT array (not shown) is formed on a surface of the first substrate 10.

The color filter layer 12 is between the first substrate 10 and the second substrate 20. In at least one exemplary embodiment, the color filter layer 12 is patterned to form a plurality of color filters (not shown) with different colors. Color filters of one color allow light of a predetermined color to pass through.

A liquid crystal layer 13 is sandwiched between the color filter layer 12 and the first substrate 10. The liquid crystal layer 13 includes a plurality of liquid crystals (not shown).

Figure 2:
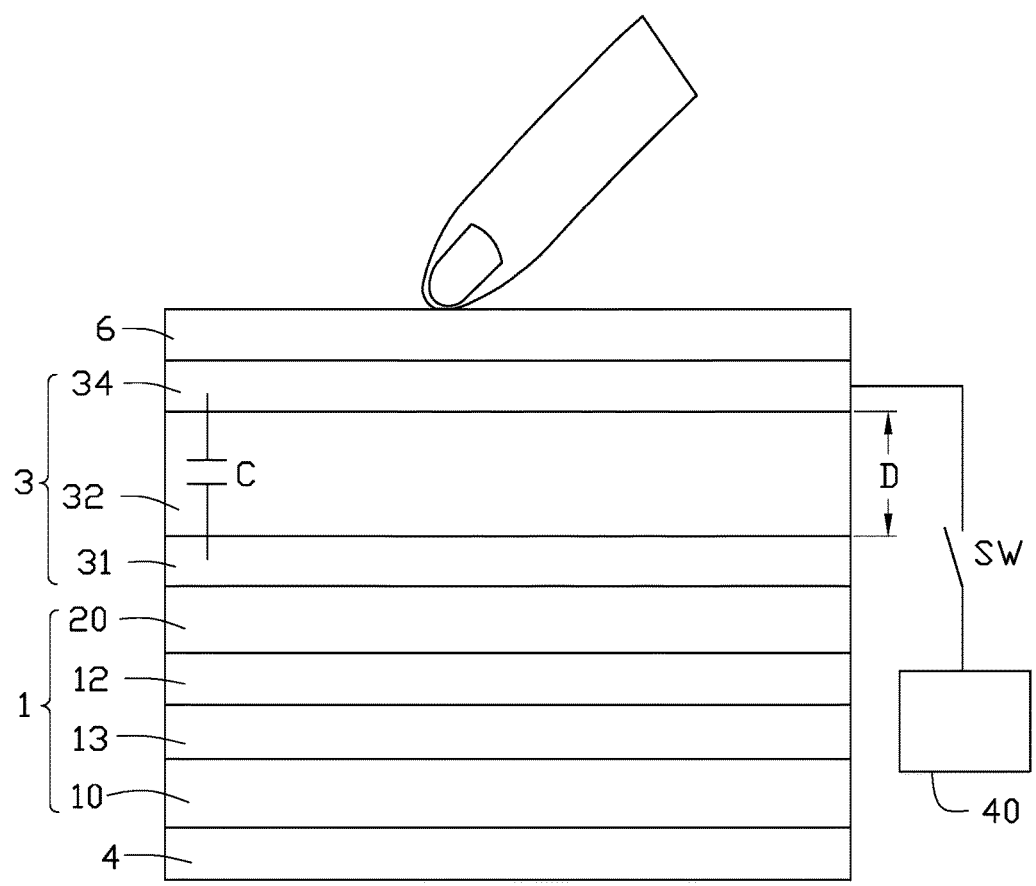
FIG. 2 is a cross-sectional view of the touch display apparatus of FIG. 1.
Figure 3A:
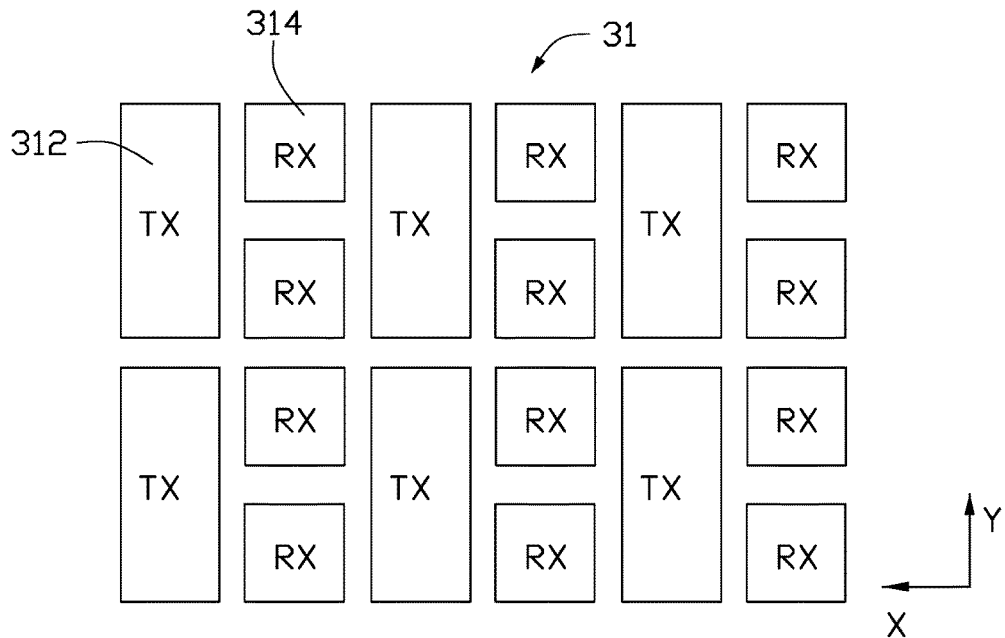
FIG. 3a is a plan view of a first exemplary embodiment of a first conductive layer of the touch display apparatus of FIG. 1.
Figure 3B:
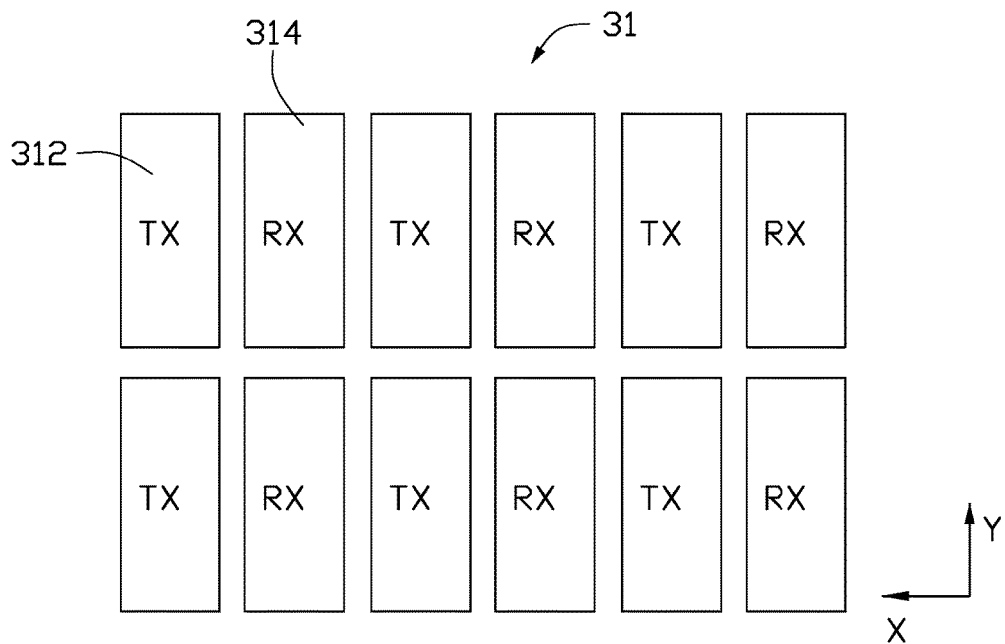
FIG. 3b is a plan view of a second exemplary embodiment of the first conductive layer of the touch display apparatus of FIG. 1.

The touch unit 3 includes a first conductive layer 31, an insulating layer 32, and a second conductive layer 34. The first conductive layer 31 is disposed on a surface of the second substrate 20 away from the first substrate 10. The first conductive layer 31 serves as a touch position detecting structure for sensing a touch position when a user's finger is pressed on the touch display apparatus 100. As shown in FIGS. 3a and 3b, the first conductive layer 31 is patterned to form a plurality of first electrodes 312 and a plurality of second electrodes 314. The first electrodes 312 and the second electrodes 314 are arranged in a matrix. Each first electrode 312 cooperates with one of the second electrodes 314 to form a position sensing capacitor (not labeled). The first conductive layer 31 can receive scan driving signals and output sensing signals. The first conductive layer 31 further cooperates with the second conductive layer 34 to form a force sensing capacitor C (shown in FIG. 2) for sensing the touch position. In this exemplary embodiment, the first conductive layer 31 is formed of transparent conductive material. Suitable materials for the transparent material comprise, for example, indium tin oxide (ITO), indium-doped zinc oxide (IZO), or aluminum-doped zinc oxide (AZO), or combinations thereof.

FIG. 3a illustrates a first exemplary embodiment of the first conductive layer 31. The first electrodes 312 and the second electrodes 314 are arranged in a matrix of rows extending along a first direction X and columns extending along a second direction Y. The first electrodes 312 are arranged in columns without the second electrodes 314, and the second electrodes 314 are arranged in columns without the first electrodes 312. Columns of only the first electrodes 312 and columns of only the second electrodes 314 are alternately arranged. Both the first electrodes 312 and the second electrodes 314 are substantially rectangular. A length of the first electrode 312 along a second direction Y is longer than a length of the second electrode 314 along the second direction Y, and a width of the first electrode 312 along the first direction X is equal to a width of the second electrode 314 along the first direction X. Two adjacent second electrodes 314 in a same column are disposed between two adjacent first electrodes 312 in a same row.

FIG. 3b illustrates a second exemplary embodiment of the first conductive layer 31. The first electrodes 312 and the second electrodes 314 are arranged in a matrix of rows extending along a first direction X and columns extending along a second direction Y. The first electrodes 312 are arranged in columns without the second electrodes 314, and the second electrodes 314 are arranged in columns without the first electrodes 312. Columns of only the first electrodes 312 and columns of only the second electrodes 314 are alternately arranged. The first electrodes 312 and the second electrodes 314 are substantially rectangular and have substantially same size. In a same row, the first electrodes 312 and the second electrodes 314 are alternately arranged. Each of the second electrodes 314 is between two adjacent first electrodes 312.

The insulating layer 32 is electrically insulative and is deformable under a pressure on the touch display apparatus 100. Such pressure changes a distance between the first conductive layer 31 and the second conductive layer 34. The insulating layer 32 is in direct contact with the first conductive layer 31. The insulating layer 32 is made of, for example, transparent and flexible dielectric material. Suitable materials for the flexible dielectric material comprises, for example, polyethersulfone (PES), polyethylenenaphthalate (PEN), polyethylene (PE), polyimide (PI), polyvinyl chloride (PVC), polyethylene terephthalate (PET), or combinations thereof.

Figure 4:
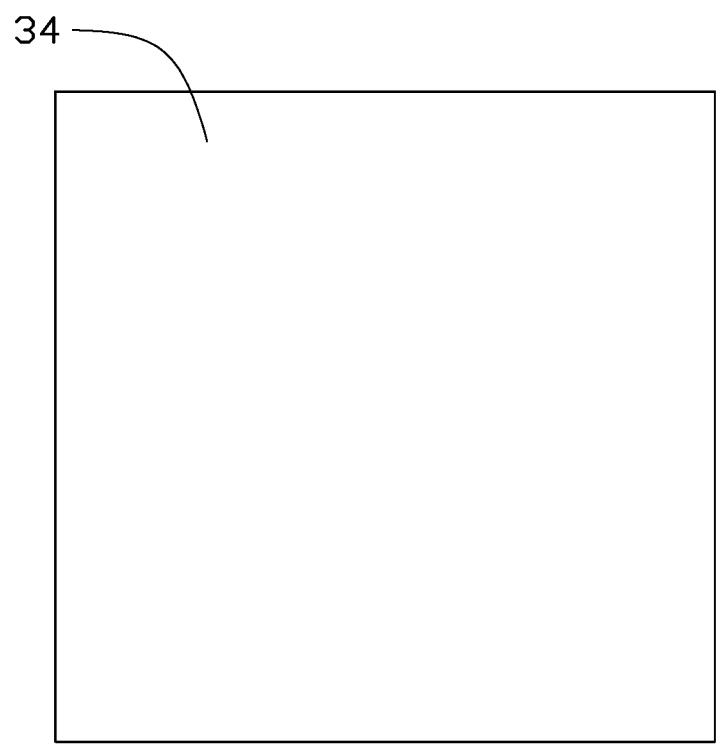
FIG. 4 is a plan view of a first exemplary embodiment of a second conductive layer of the touch display apparatus of FIG. 1.

The second conductive layer 34 is a transparent conductive layer, and is in direct contact with the insulating layer 32. The second conductive layer 34 cooperates with the first conductive layer 31 to form the force sensing capacitor C for sensing the pressure of the touch action. The second conductive layer 34 is electrically connected to a power source 40 by a switch SW (as shown in FIG. 2). The second conductive layer 34 receives a voltage from the power source 40 when sensing the pressure of the touch action. The second conductive layer 34 can be a transparent metal sheet without patterning as shown in FIG. 4. In other exemplary embodiments, the second conductive layer 34 is grounded when sensing a touch position process.

A distance D between the first conductive layer 31 and the second conductive layer 34 serves as a predetermined distance when there is no touch operation on the touch display apparatus 100. The capacitance of the force sensing capacitor C is in an initial capacitance when there is no touch operation. When a touch operation is occurred, the insulating layer 32 deforms to decrease the distance D between the first conductive layer 31 and the second conductive layer 34, which causes the capacitance of the capacitor C to increase. The touch display apparatus 100 calculates a difference between the initial capacitance of the force sensing capacitor C and the current capacitance of the capacitor C, and processes the difference to sense the pressure of the touch action.

Figure 5:
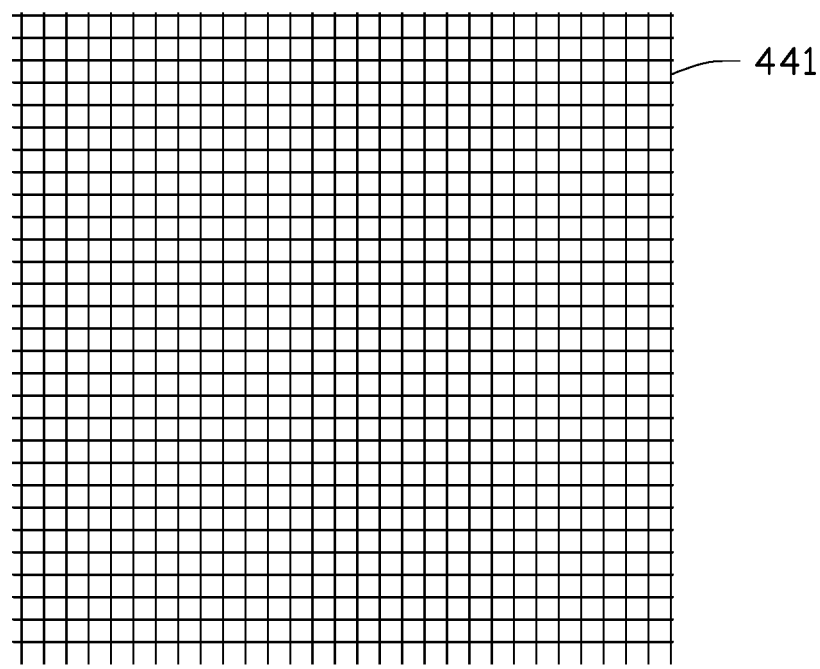
FIG. 5 is a plan view of a second exemplary embodiment of the second conductive layer of the touch display apparatus of FIG. 1.

FIG. 5 illustrates a second exemplary embodiment of the second conductive layer 44. The second conductive layer 44 includes a plurality of third electrodes 441. The third touch electrodes 441 are crossed with each other to form a metal mesh.

Figure 6:
FIG. 6 is a plan view of a third exemplary embodiment of the second conductive layer of the touch display apparatus of FIG. 1.
Figure 6:
Figure 6:
Figure 6:
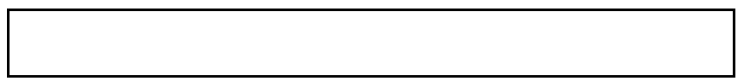
Figure 6:
Figure 6:
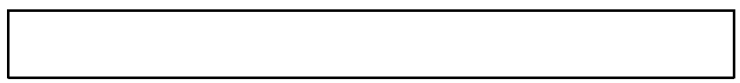
Figure 6:
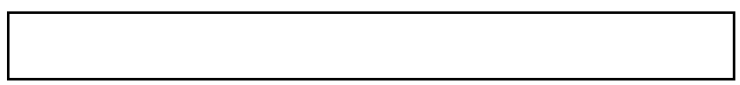
Figure 6:
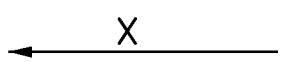

FIG. 6 illustrates a third exemplary embodiment of the second conductive layer 54. The second conductive layer 54 is patterned to form a plurality of third touch electrodes 541 spaced from each other. Each third touch electrode 541 has a strip shape and extends along the first direction X. The third touch electrodes 541 are parallel with each other.

Figure 7:
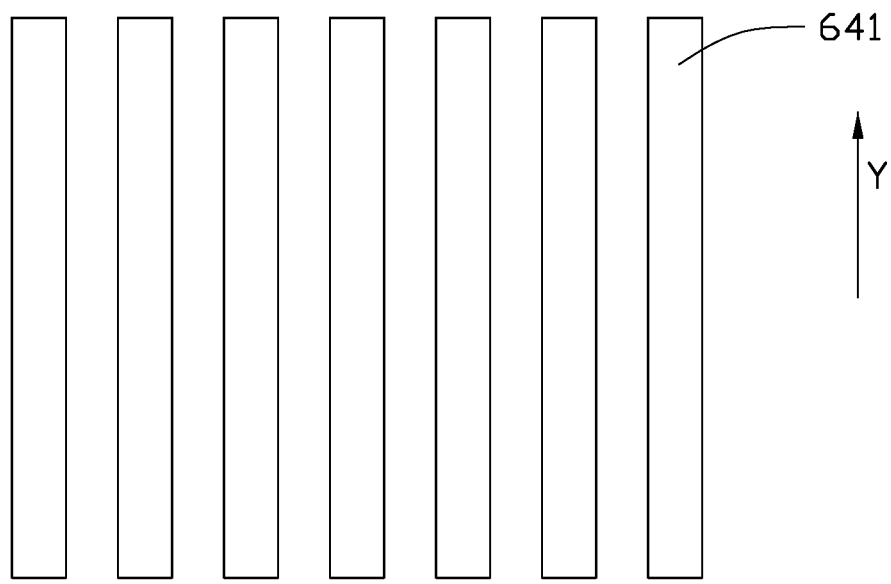
FIG. 7 is a plan view of a fourth exemplary embodiment of the second conductive layer of the touch display apparatus of FIG. 1.

FIG. 7 illustrates a fourth exemplary embodiment of the second conductive layer 64. The second conductive layer 64 is patterned to form a plurality of third touch electrodes 641 spaced from each other. Each third touch electrode 641 has a strip shape and extends along the second direction Y. The third touch electrodes 641 are parallel with each other.

Figure 8:
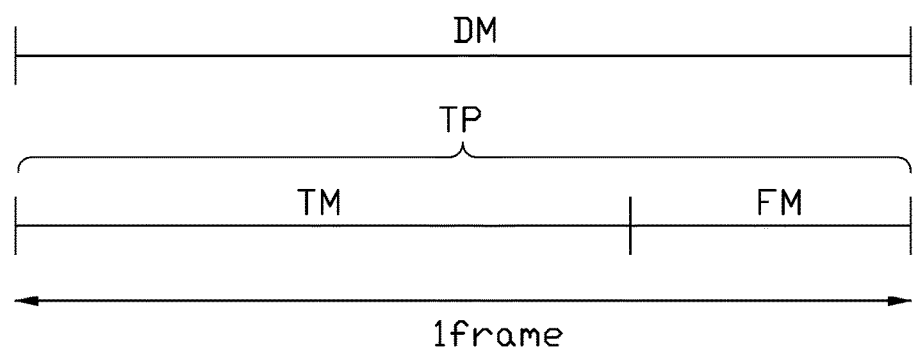
FIG. 8 is a diagrammatic view of a first exemplary embodiment of a driving time sequence of the touch display apparatus of FIG. 1.

FIG. 8 illustrates a first exemplary embodiment of a driving time sequence of the touch display apparatus 100. In one frame, the display unit 1 displays images based on data signals, and at the same time the touch unit 3 senses a touch operation and a pressure of the touch action, thus the touch display apparatus 100 virtually simultaneously operates under a display period DM and a touch period TP. The touch period TP includes a first touch sub-period TM for sensing the position of the touch action and a second touch sub-period FM for sensing the pressure of the touch action. During the first touch sub-period TM, the switch SW turns off, the first conductive layer 31 senses a position based on the position sensing capacitors formed by the first electrodes 312 and the second electrodes 314, and the second conductive layer 34 is floated. During the second touch sub-period FM, the switch SW turns on, the voltage is provided to the second conductive layer 34, the first electrodes 312 and the third electrode 341 form the force sensing capacitor C, and the pressure of the touch action is calculated based on the capacitance difference of the force sensing capacitor C between the initial capacitance and a capacitance when touch display apparatus 100 currently being touched.

Figure 9:
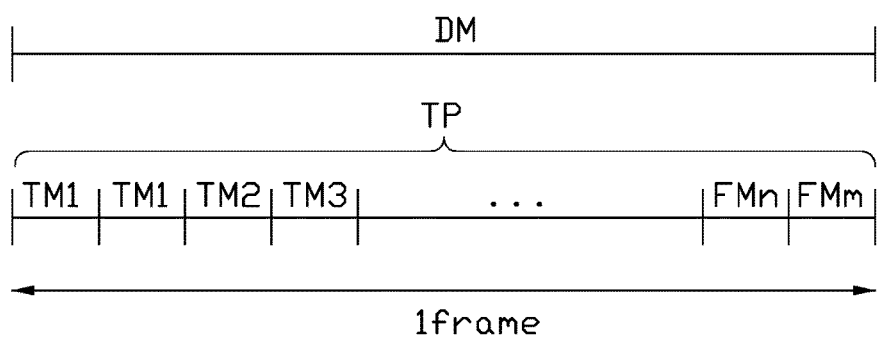
FIG. 9 is a diagrammatic view of a second exemplary embodiment of a driving time sequence of the touch display apparatus of FIG. 1.

FIG. 9 illustrates a second exemplary embodiment of a driving time sequence of the touch display apparatus 100. In one frame, the display unit 1 displays images based on data signals, and at the same time the touch unit 3 senses a touch operation and a pressure of the touch action. Thus the touch display apparatus 100 sequentially and virtually simultaneously to the user operates under a display period DM and a touch period TP. During the display period DM, the touch display apparatus 100 displays images. During the touch period TP, the touch display apparatus 100 senses the pressure and the position of the touch action. The touch period TP includes a plurality of first touch sub-periods TM1-TMn for sensing a position of the touch action and a plurality of second touch sub-periods FM1-FMn for sensing the pressure of the touch action. The first touch sub-periods TM1-TMn and the second touch sub-periods FM1-FMn occur alternately. During each of the first touch sub-periods TM1-TMn, the switch SW turns off, the first conductive layer 31 senses a touch position based on the position sensing capacitors formed by the first electrodes 312 and the second electrodes 314, and the second conductive layer 34 is floated. During each of the second touch sub-periods FM1-FMn, the switch SW turns on, the voltage is provided to the second conductive layer 34, the first electrodes 312 and the third electrode 341 form the force sensing capacitor, and the pressure of the touch action is calculated based on the capacitance difference of the force sensing capacitor C between a current capacitance when touch display apparatus 100 being touched and the original specified capacitance.

Based on the structure, the first conductive layer 31 cooperates with the second conductive layer 34 besides the display unit 1 to sense the pressure of the touch action, and the touch display apparatus 100 virtually simultaneously operates under a display period DM and a touch period TP in one frame. Therefore, a touch function of the touch display apparatus 100 is improved.

While various exemplary and preferred embodiments have been described the disclosure is not limited thereto. On the contrary, various modifications and similar arrangements (as would be apparent to those skilled in the art) are also intended to be covered. Therefore, the scope of the appended claims should be accorded the broadest interpretation so as to encompass all such modifications and similar arrangements.

What is claimed is:

1. A touch display apparatus comprising:
a display unit displaying images;
a touch unit, the touch unit overlapping with the display unit, and for sensing a touch action applied on the touch unit; and
wherein the touch unit comprising:
a first conductive layer overlapping with the display unit, and the first conductive layer configured to sense a position of the touch action on the touch unit;
an insulating layer overlapped on and in direct contact with the first conductive layer, and deforming based on the force of a touch action applied to the touch display apparatus; and
a second conductive layer overlapped on and direct contacted with the insulating layer;
wherein the first conductive layer is adjacent to the display unit, the second conductive layer is located on a surface of the insulating layer opposite from the display unit; the first conductive layer comprises a plurality of first electrodes and a plurality of second electrodes; the first electrodes and the second electrodes are arranged in a matrix; each of the first electrodes is coplanar with a corresponding one of the second electrodes, and cooperates with one of the second electrodes to sense the position of the touch action; each of the first electrodes and the second electrodes cooperates with the second conductive layer to sense a pressure of the touch action.

2. The touch display apparatus of claim 1, wherein during one frame, the display unit display operates under a display period for displaying images and at the same time the touch unit operates under a touch period for sensing the pressure and the position of the touch action applied on the touch display apparatus.

3. The touch display apparatus of claim 2, wherein the touch period comprises a first touch sub-period for sensing a position of the touch action and a second touch sub-period for sensing the pressure of the touch action; during the touch display apparatus operates under the first touch sub-period, the first electrodes and the second electrodes cooperate with each other for sensing the position of the touch action; during the touch display apparatus operates under the second touch sub-period, the first conductive layer and the second conductive layer cooperate with each other to sense the pressure of the touch action.

4. The touch display apparatus of claim 2, wherein the touch period comprises a plurality of first touch sub-periods for sensing a position of the touch action and a plurality of second touch sub-periods for sensing the pressure of the touch action; the first touch sub-periods and the second touch sub-periods are alternately in turn; each of the second sub-period is between two adjacent first sub-periods; during the touch display apparatus operates under the first touch sub-period, the first conductive layer senses the position of the touch action; during the touch display apparatus operates under the first touch sub-period, the first conductive layer and the second conductive layer cooperate with each other to sense the pressure of the touch action.

5. The touch display apparatus of claim 1, wherein the first electrodes are arranged in columns without the second electrodes; the second electrodes are arranged in columns without the first electrodes; two adjacent second electrodes in a same column are disposed between two adjacent first electrodes in a same row.

6. The touch display apparatus of claim 1, wherein the first electrodes are arranged in columns without the second electrodes; the second electrodes are arranged in columns without the first electrodes; each second electrode is disposed between two adjacent first electrodes in a same row.

7. The touch display apparatus of claim 6, wherein the second conductive layer is patterned to form a plurality of third touch electrodes spaced from each other.

8. The touch display apparatus of claim 7, wherein the third electrodes are crossed with each other to form a metal mesh.

9. The touch display apparatus of claim 7, wherein the third electrodes are parallel with each other and are arranged along a specified direction.

10. The touch display apparatus of claim 1, wherein the second conductive layer is metal sheet.

11. A touch display apparatus comprising:
a display unit displaying images;
a touch unit overlapped on the display unit, and sensing a touch action applied on the touch display apparatus; and
wherein during one frame, the display unit display operates under a display period for displaying images, and at the same time the touch unit operates under a touch period for sensing the pressure and the position of the touch action applied on the touch display apparatus; the touch period comprises at least one first touch sub-period for sensing a position of the touch action and at least one second touch sub-period for sensing the pressure of the touch action; the at least one first touch sub-period and the at least one second touch sub-period are alternately in turn; during the touch display apparatus operates under the at least one first touch sub-period, the touch unit senses the position of the touch action; during the touch display apparatus operating under the at least one second touch sub-period, the touch unit senses the pressure of the touch action;

the touch unit comprises a first conductive layer, an insulating layer, and a second conductive layer; the first conductive layer is patterned to form a plurality of first electrodes and a plurality of second electrodes; the first electrodes and the second electrodes are arranged in a matrix; each of the first electrodes is coplanar with a corresponding one of the second electrodes; during the at least one first touch sub-period, each of the first electrodes cooperates with the corresponding second electrode to sense a position of the touch action; during the at least one second touch sub-period, each of the first electrodes and the second electrodes cooperate with the second conductive layer to sense the pressure of the touch action.

12. The touch display apparatus of claim 11, wherein the first conductive layer overlapped on the display unit is adjacent to the display unit, the insulating layer overlapped on the first conductive layer is direct contacted with the first conductive layer, and deforms based on the pressure; the second conductive layer overlapped on the insulating layer is direct contacted with the insulating layer, the first conductive layer is adjacent to the display unit and the second conductive layer is located on a surface of the insulating layer opposite from the display unit.

13. The touch display apparatus of claim 11, wherein the second conductive layer is sheet metal.

14. The touch display apparatus of claim 11, wherein the second conductive layer is patterned to form a plurality of third touch electrodes spaced from each other.

15. The touch display apparatus of claim 14, wherein the third electrodes are crossed with each other to form a metal mesh.

16. The touch display apparatus of claim 14, wherein third electrodes are parallel with each other and are arranged along a specified direction.

17. The touch display apparatus of claim 11, wherein the first electrodes are arranged in columns without the second electrodes; the second electrodes are arranged in columns without the first electrodes; two adjacent second electrodes in a same column are disposed between two adjacent first electrodes in a same row.

18. The touch display apparatus of claim 11, wherein the first electrodes are arranged in columns without the second electrodes; the second electrodes are arranged in columns without the first electrodes; each second electrode is disposed between two adjacent first electrodes in a same row.

19. The touch display apparatus of claim 11, the touch period comprises a first touch sub-period for sensing a touch position and a second touch sub-period for sensing the pressure of the touch action.

20. The touch display apparatus of claim 11, the touch period comprises a plurality of first touch sub-periods and a plurality of second touch sub-periods; the first touch sub-periods and the second touch sub-periods are alternately in turn.

* * * * *